No. 618,427. Patented Jan. 31, 1899.
J. B. MOORE.
CALCULATING MACHINE.
(Application filed Apr. 5, 1897.)

(No Model.) 5 Sheets—Sheet 1.

WITNESSES:

INVENTOR
Jacob B. Moore
BY H. Albertus West
ATTORNEY

No. 618,427. Patented Jan. 31, 1899.
J. B. MOORE.
CALCULATING MACHINE.
(Application filed Apr. 5, 1897.)
(No Model.) 5 Sheets—Sheet 2.
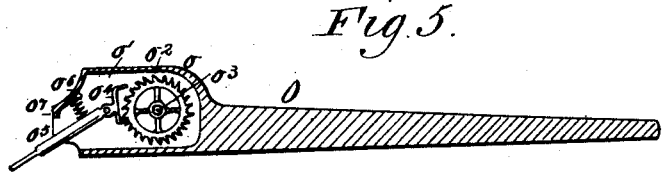
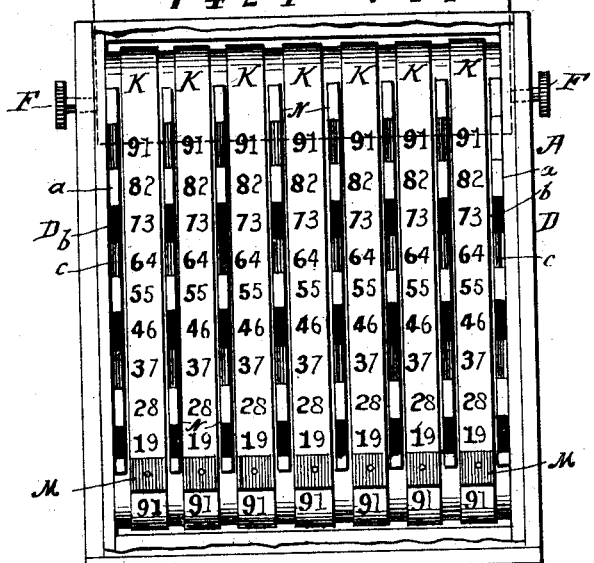

No. 618,427. Patented Jan. 31, 1899.
J. B. MOORE.
CALCULATING MACHINE.
(Application filed Apr. 5, 1897.)
(No Model.) 5 Sheets—Sheet 3.
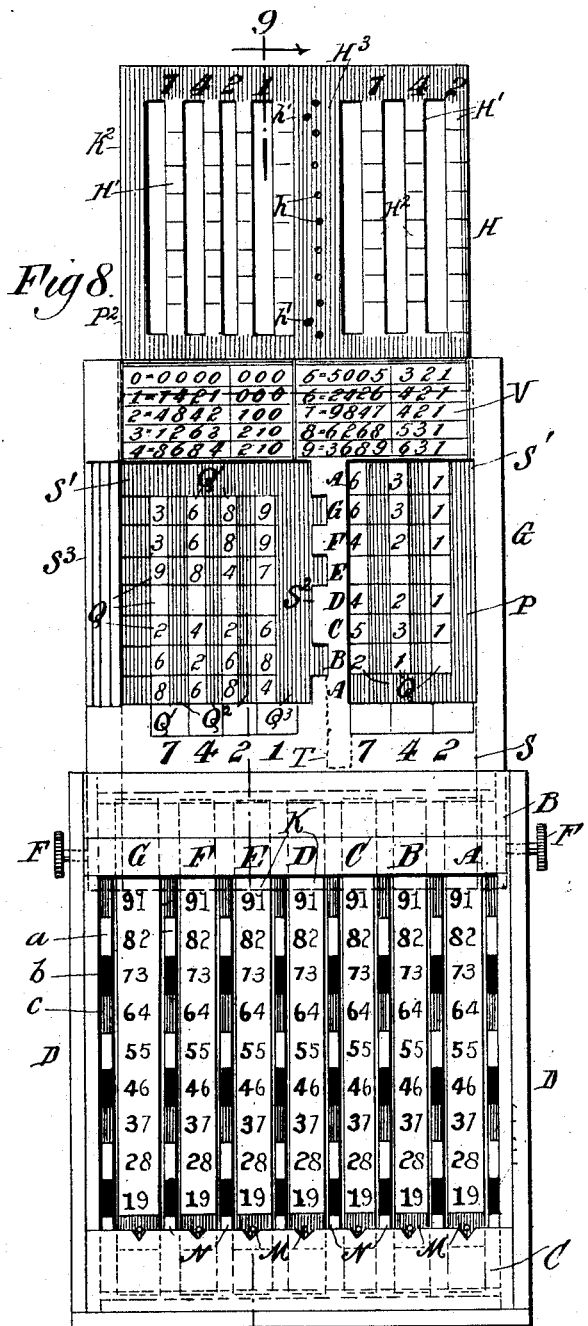
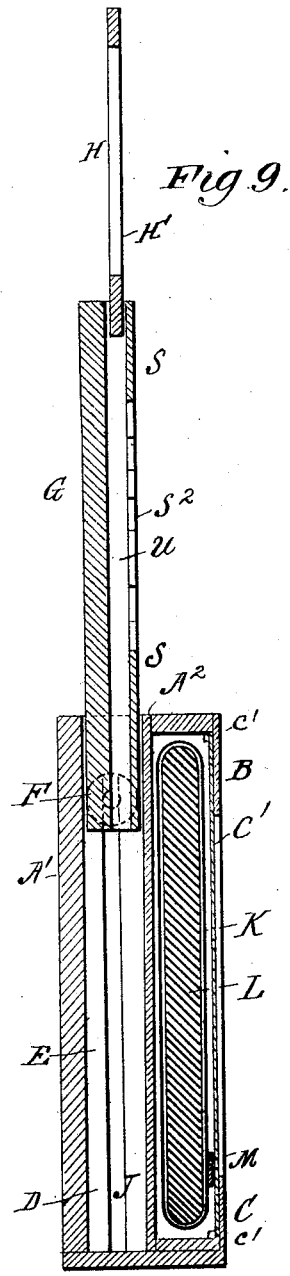
INVENTOR
Jacob B. Moore
BY H. Albertus West
ATTORNEY No. 618,427. Patented Jan. 31, 1899.
J. B. MOORE.
CALCULATING MACHINE.
(Application filed Apr. 5, 1897.)
(No Model.) 5 Sheets—Sheet 4.

WITNESSES:

INVENTOR
Jacob B. Moore
BY
ATTORNEY

No. 618,427. Patented Jan. 31, 1899.
J. B. MOORE.
CALCULATING MACHINE.
(Application filed Apr. 5, 1897.)

(No Model.) 5 Sheets—Sheet 5.

Witnesses:
J. B. McGirr
Joseph Keller

Inventor:
Jacob B. Moore
By H. Albertus West
attorney

UNITED STATES PATENT OFFICE.

JACOB B. MOORE, OF NEW YORK, N. Y.

CALCULATING-MACHINE.

SPECIFICATION forming part of Letters Patent No. 618,427, dated January 31, 1899.

Application filed April 5, 1897. Serial No. 630,762. (No model.)

*To all whom it may concern:*

Be it known that I, JACOB B. MOORE, a citizen of the United States, and a resident of New York, in the county of New York and State of New York, have invented certain new and useful Improvements in Calculating-Machines, of which the following is a specification.

The object of my invention is to provide a machine or device of simple and inexpensive construction designed to facilitate the fundamental operations of arithmetic and to familiarize the student therewith, their relations, modifications, and forms of proof; and to these ends my invention consists in an apparatus constructed on the principles hereinafter described and claimed, comprising, *inter alia*, movable or sliding and numbered tapes or bands designed in performing a problem to be operated by a pointer which automatically registers and indicates the tens to be carried.

The invention also consists in providing the main frame with movable sections to be employed in performing examples in multiplication and division, said sections being spaced, numbered and lettered as hereinafter set forth.

The invention also consists in the construction of the said registering and carrying pointer and also in the construction, arrangement, and combination of parts, all as hereinafter described and claimed.

Figure 1:
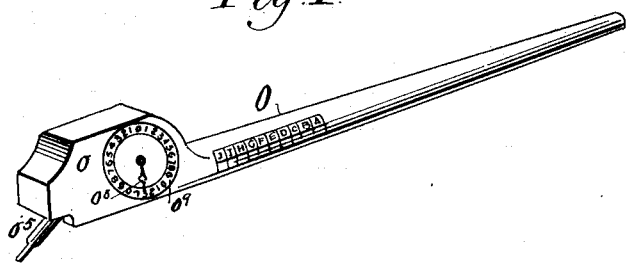
Figure 2:
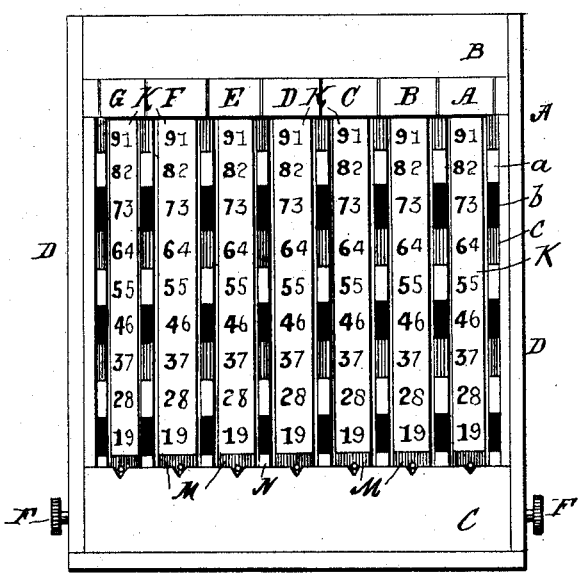
Figure 3:
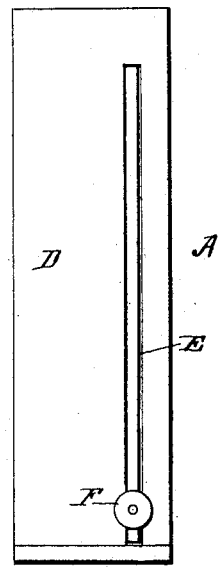
Figure 4:
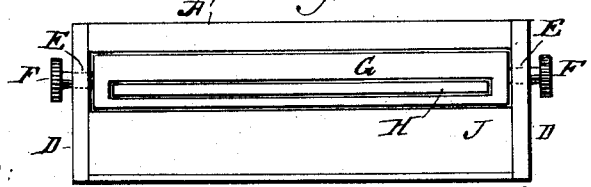
Figure 10:
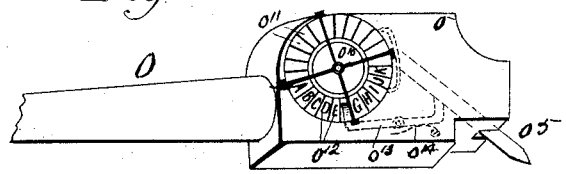
Figure 11:
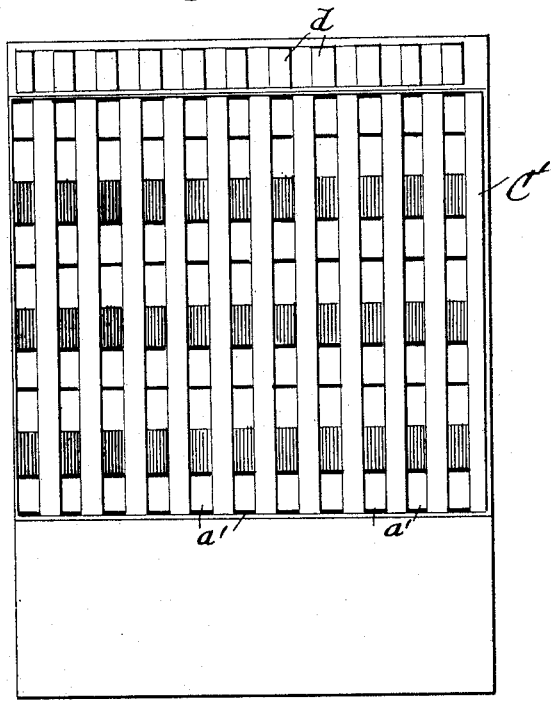
Figure 12:
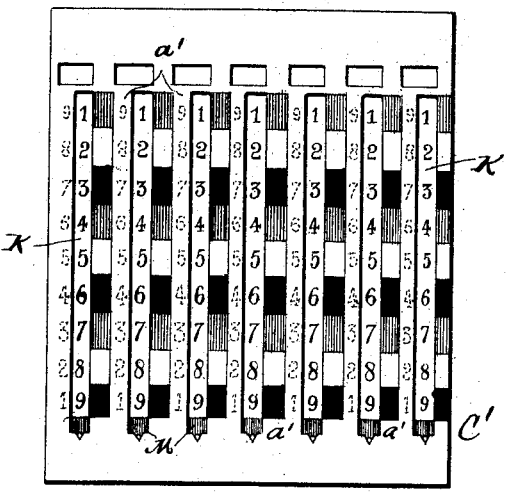

In the accompanying drawings, to which reference is made and which form a part of this specification, Figure 1 is a perspective of the automatically-carrying pointer. Fig. 2 is a front elevation of the device as it appears when arranged for performing addition or subtraction, the screen C' being removed. Fig. 3 is an edge or side view of the same. Fig. 4 is a plan view of the same. Fig. 5 is a longitudinal sectional elevation of the pointer. Fig. 6 is a front elevation showing the device with the section G shoved out. Fig. 7 is a perspective view of one of the sliding tapes. Fig. 8 is a front elevation of the device arranged for performing multiplication and division. Fig. 9 is a sectional elevation of the same on the line 9 9 of Fig. 8. Fig. 10 shows a modified form of pointer. Fig. 11 is a front view of the movable screen. Fig. 12 is a detail illustrating the laterally-sliding screen.

A represents a casing, preferably of a size to hold conveniently in one hand. Said casing A is open at the front save for the flaps or flanges B C and sliding screen C', and its side walls D D are formed with slots E E, which form ways for the finger pieces or knobs F F, by which the sections G H may be slid out from or withdrawn into a chamber J at the back of the main casing A, as clearly shown in Figs. 8 and 9. The back A' of the main casing and the partition $A^2$ form in this instance the said chamber J, though I do not limit myself to this detail of construction.

K K represent movable strips or tapes, of leather, cloth, parchment, or other suitable material, adapted to be moved up and down on a suitable support L, held in the main casing A. The tapes or bands K are by preference each wrapped around the said support L and united at the ends, and each tape is printed or otherwise provided with four sets of digits from "0" to "9", both inclusive, as shown in Fig. 7, and each tape is also provided with a device for moving the tape—a knob, aperture, or apertured button M, by which the tape can be moved along the support L back and forth only so far as permitted by the button M, but sufficiently to show any of the figures at the sight-openings in performing calculations. The digits appear in reverse order from the said button M, as indicated in Fig. 7, and preferably in different colors, or they may be made distinguishable by making the right-hand columns, for example, in delicate or light print and the left in heavy print, as indicated. The said bands or tapes K move between divisional ribs, flanges, or demarcations N on the face of the support L, and each of said demarcations is checkered or formed with party-colors $a$ $b$ $c$, as illustrated by solid black, solid white, and parallel lines in Figs. 2, 6, and 8.

The screen C' is held to slide laterally in guides $c'$ $c'$, Fig. 9, and is constructed to form a series of spaced columns $a'$ $a'$, which are divided also into party-colored compartments, as illustrated in Fig. 12, matching with those on the divisional ribs aforesaid. By shifting the screen to its right limit the light figures on the tapes, provided for subtraction, are disclosed in the spaces between its columns and the heavy figures on the tapes, provided for addition, are hidden. On shifting it back to its left limit the heavy figures for addition are disclosed and the light figures for subtraction are hidden.

O represents the pointer to be used for moving the tapes or slides K in performing any calculation. It is formed with a delicate handle, which is enlarged at $o$. In this enlargement is formed a chamber $o'$, in which is placed an escapement-wheel $o^2$, held on a shaft $o^3$. An anchor-pallet $o^4$ is arranged to engage with the teeth of the escapement-wheel $o^2$. The pallet is provided with a projecting finger $o^5$, constructed to enter the aperture or otherwise engage with the blocks M on the bands or tapes K. The said finger is normally held depressed by a small spring $o^6$. In moving the tapes upward by the said pointer no action takes place in the pointer. On each downward movement of the pointer the pallet moves the escapement-wheel $o^2$ around one tooth, carrying the hand $o^8$ around the numbered scale $o^9$ on the side of the pointer.

Addition is performed with the heavy dark or left-hand digits on the tapes K and the letters A B C, &c., on the face of the flange B, Figs. 2 and 8, which letters represent the succession of columns from right to left of any example.

In performing any example the tapes or bands will be placed at the outset, as shown in Fig. 8, with the buttons M partially hidden by the lower plate or flange C, the form of said buttons limiting their motion at the flanges B and C, so that between said flanges the ten digits only are always clearly shown on either column of the bands. The screen C' will be pushed to the left to its limit, thus covering the right-hand column of digits on the bands K, or, as shown in Figs. 2, 6, and 8, it may be removed without impairing the practical efficiency of the machine. Place the end of the pointer in the button fixed on the band or tape operated on and for each successive figure of the column to be added move the handle of the pointer on the vertical line of the tape upward or downward, as the case may be, so as to aline the button M with the horizontal row of compartments or numerals with which that figure was previously alined. The right-hand digit of the result of each tape operated on will be shown on either of its two consecutive right-hand columns of numerals in the opening provided therefor in the inclosing casing over that column, or horizontally in line with its button M on the left-hand column of any tape having its button M standing at the lower limit or flange C. The reason of this peculiar mechanical routine and of the special construction of the tapes or slides K lies in the new mode of operation adopted for the performance of addition or subtraction—to wit, of carrying zero to the place of the number to be added or subtracted instead of the converse principle. This routine requires not more than one-half of the operator's time, labor, and attention required by the converse principle. The construction employs but two columns of numerals instead of three and but one of the two physical ingredients bearing said three columns—namely, the stationary and the movable part of the combination employed in the old mode of operation—the movable part being here newly adapted, arranged, and subcombined as to its parts, so as to perform, as described, the function of the stationary part as well as its own. Both the routine and the construction will be clearly elucidated in detail on applying the two arithmetical principles following: First, when a numeral is added to a second one or the complement of ten to the first is subtracted from the second, the same numeral is obtained as the right-hand digit of the result; second, when a unit is to be carried in adding a numeral to a second one, none is to be carried when the complement of ten to the first is subtracted from the second, and vice versa. The carrying to the adjacent bands at the left of the left-hand digit or digits of the result is registered on the dial of the pointer, as hereinafter described, and by means of the pointer is transferred therefrom to said bands by the operator when required.

In subtraction record the minuend of the example on the tapes or slides K by operation on their heavy black figures, as in addition, and move the screen C' to the right to its limit, or it may be removed without impairing the practical efficiency of the machine, as in addition. The operation of subtracting the subtrahend or subtrahends is the same on the light figures of the tape as adding on the heavy figures.

The provision for carrying is made in the automatic action of the handle or pointer by which the bands or tapes K are moved. The dial $o^9$ is divided into twenty-five compartments or any convenient number thereof, the width of which answers to a tooth of the escapement-wheel. These compartments are numbered, commencing at the lower part of the dial's vertical diameter. The hand $o^8$ is attached to the operating-wheel's axle, so as to be moved by the wheel over these compartments from zero to the right and is also adapted to be movable or set back at will.

In addition each movement of a tape or band downward requires unity to be carried to the next band at the left. This is due to the peculiar arrangement of the tapes and the four sets of digits thereon, arranged as shown in Fig. 7, and the arrangement of the tapes on the support L, taken in connection with the arithmetical principles hereinbefore referred to. When the tape or band is moved upward, nothing is to be carried. By the foregoing means when the band is moved downward past one compartment or more by the pointer the latter tallies one and no more and when the band is moved upward it makes no registration. In subtraction the condition is reversed. Movement of the tapes or bands upward indicates that a unit must be carried and movement downward that no carrying is required. For this purpose in subtraction the pointer is used upside down.

At the conclusion of the operation on any tape or slide K, whether of addition or subtraction, or both, place the number registered on the pointer on the next left-hand tape or tapes if it exceeds nine and with a circular motion of the adjacent thumb return the hand on the dial to zero.

So far for the carrying in columnar addition or subtraction. For the carrying when the operation is by rows and unity only is required to be carried for the invariable column of but two numerals in any case a second dial $o^{10}$ is screwed on to the right end of the escapement-wheel's axle. It thus moves with the wheel, and by means of projections from it it can also be moved backward and forward at will by the operator with his adjacent forefinger. This disk is divided into compartments or grooves $o^{11}$ of a width answering to a tooth of the wheel, each compartment containing a tongue or block $o^{12}$, which is inscribed with a letter corresponding in succession to the letters distinguishing the bands or tapes K and which is capable of being depressed or moved inward and restored in its compartment or groove. Within the pointer a lever $o^{13}$ is placed, one end of which is acted upon by the downward movement of the finger $o^5$, which is applied to the tapes or bands, and its other end on such action depresses or moves inward the tongue or block in the compartment of the disk above it. Beneath the first arm of the lever is placed a reacting spring. The spring $o^6$ over the finger $o^5$ cannot send the latter far enough down to affect the lever, and this spring $o^{14}$ beneath the lever cannot send the shaft upward far enough to move the wheel. Now in addition or subtraction by rows use the pointer with reference to this right-hand disk and use it as in the operation by columns, but with the following distinction, viz: When adding, press downward slightly on the pointer on moving the tape upward therewith, and when subtracting press upward slightly on the pointer on moving the tape downward therewith. Each groove or compartment of the disk will be thus brought in succession over the lever, and as the latter will depress the letters of those tapes or bands only from which nothing is to be carried those blocks or tongues which have passed it and are found undepressed at the completion of the operation on the row will indicate the tapes or bands from which a unit is to be carried. Perform this operation and then move this disk forward by means of its projections with the adjacent forefinger, thus moving it against the pointer's side and restoring the depressed letters. Now move the projections backward till the initial one, duly marked, appears on top, showing the disk to be returned to its starting-place, with its letter A over and within range of the lever ready for the operation on another row, or, when necessary, place in this manner any other letter over the lever.

Fig. 8 shows the arrangement of the calculating-machine for multiplication or division. P is a tablet in section G, of ivory, enameled metal, or other erasable material. It is permanently marked into horizontal rows Q—any convenient number thereof—and seven columns Q'. Each of the latter is separated from the next by a broad mark $Q^2$ to distinguish the partial products of the several digits of the given multiplicand multiplied by the constant set of numerals 7 4 2 1, which products are placed in the order of said digits of the multiplicand on the horizontal rows Q, the right-hand numeral of said products being placed on its row at the left of a space which corresponds to the vertical strip $S^2$, hereinafter described, and the left-hand numeral on the next row above at the right of said space, as shown in Fig. 8, thus arranging said products in their proper columnar order for their due addition by a regular vertical movement of section H over the tablet P.

The slide or section H is composed of seven pillars or columns H', corresponding to the broad marks $Q^2$ separating the columns Q'. Each column has a front adapted to receive erasable marks and is divided into compartments $H^2$, vertically corresponding to the rows Q. The rows and columns of section H, which represent the given multiplier in the proposed multiplication, are thus made to correspond with those of section G, which represent the multiplicand, and in further correspondence each column of said section H, with its adjacent opening at the left, is respectively designated by the figures 7 4 2 1 7 4 2, since the several digits of the given multiplier may be duly substituted for those of the constant multipliers 7 4 2 1 at each row of the partial products of the multiplicand multiplied by the latter, already placed on tablet P, by being noted by marks on the respective columns 7 4 2 1 7 4 2 of section H, either as one or composed of two of the said numerals 7 4 2 1. In further correspondence with the columns Q' of section G the three columns and their respective slots of section H at the right are separated from the four at the left by a vertical bar $H^3$, containing holes or notches $h$, corresponding with the compartments on the pillars and convenient for the due motion of the slide or section H over the tablet P, compartment by compartment, by means of a pointer. This vertical bar $H^3$ also shows two spots or disks $h'$ at the top and bottom row of the section H, and also on the left-hand frame of the latter opposite its rows is placed a column $P^2$ for erasable marks to correspond in number and position to those on the pillars, and are for the reception of the digits of the given multiplier.

S represents the face plate or frame of section G. At its top is placed the following permanent table V, Fig. 8:

```
0 = 0000  000      5 = 5005  321
1 = 7421  000      6 = 2426  421
2 = 4842  100      7 = 9847  421
3 = 1263  210      8 = 6268  531
4 = 8684  210      9 = 3689  631
```

In the middle of the frame S are two openings so placed as to disclose on the left the four columns $Q'$ of section G and the corresponding pillars $H'$ of section H, together with the erasable strip $P^2$ on the left-hand frame of section H, and similarly on the right the three columns $Q'$ at the right of the tablet P, together with the pillars $H'$ at the right of section H, corresponding to those columns. These two openings are separated by a vertical strip $S^2$, Fig. 8, which is notched on its left side, so as to permit and regulate the vertical movement of the section H over the tablet P one row at a time by means of a pointer inserted in any of the holes $h$ in the vertical bar $H^3$ of section H, Fig. 8, convenient during the vertical progress of the latter over the tablet P. On its right side the vertical strip $S^2$ supports a movable endless band T, Fig. 8, twice consecutively lettered, or, when preferable, a greater number of times, with the series of letters distinguishing the bands or slides K, hereinbefore described, and in their order for convenient reference to the same during the performance of multiplication or division.

The principle embodied in the foregoing construction and that hereinafter described and the operation thereof is the new one of interpolating a set of multipliers at once constant and few between the given multiplier and multiplicand in performing multiplication, and analogously in performing division a constant and small set of quotients between the resulting quotient and given dividend.

At the bottom of the two openings in the face-frame S is placed on the latter, so as to match the seven columns of section H, disclosed through them, a row of seven compartments of material to receive erasable marks, respectively numbered 7 4 2 1 7 4 2, which are used in divisions to note the quotient and must be wholly ignored when section H, analogously representing the multiplier, is used in performing multiplication. On the left side of the face-frame S, opposite its openings, is also placed a strip of erasable material $S^3$, Fig. 8, for the reception of the digits of the multiplicand or divisor.

The face-frame S is fastened to the section G, so as to form a passage U for the section H to slide in over the tablet P, as shown clearly in Fig. 6.

In performing multiplication shove section G outward to its limit, as shown in Fig. 6. Mark the digits of the given multiplicand on the erasable strip $S^3$, commencing at the bottom compartment with the right-hand digit. Opposite each digit place on the rows of tablet P the seven figures found opposite the said digit in the table V, the last three one row above the first four. On the erasable strip $P^2$ Fig. 8, on the left-hand side of section H mark the digits of the given multiplier, commencing at the bottom compartment with the left-hand digit. Opposite each digit place erasable marks on the pillars $H'$ of section H, according to the following table:

For 0 = No mark.
1 = On pillar 1.
2 = On the two pillars 2, 2.
3 = On the three pillars 2, 1, 2.
4 = On the two pillars 4, 4.
5 = On the three pillars 4, 1, 4.
6 = On the four pillars 4, 2, 4, 2.
7 = On the two pillars 7, 7.
8 = On the three pillars 7, 1, 7.
9 = On the four pillars 7, 2, 7, 2.

Note 1. In this table the significant digits of the given multiplier which are not 7, 4, 2, or 1 are considered to be composed of two of the latter.

Note 2. In general practice the directions above for marking the erasable strips $S^3$ and $P^2$ may be disregarded, said strips not being necessary to the practical working of the machine, but aiding merely in familiarizing the student therewith.

The partial multiplications of the example—for instance, that given, Fig. 8, 9970684 × 62—are now completed and it is ready for the addition of the columns, resulting in the digits of the product sought. Now place the highest row used of the compartments of section H over the bottom row of tablet P and draw the slide or section H upward over the latter, one row of compartments at a time, until the bottom row of the section H is placed over the highest row used on the tablet P, at each step adding on the band or tape K whose letter is indicated by the spot or disk $h'$ all the figures on the tablet P opposite which at the right marks are found on the pillars $H'$. The movable band of letters T, with its letter A alined with the bottom row of tablet P, is kept stationary during the performance of multiplication, as described. When a return to the band A is indicated by the disk $h'$ in its progress past the letters on said band T, transfer the digits of the product thus far recorded on the bands K to the calculating-sheet, and return the buttons M on the bands to the flange C, so as to be ready for the addition of the remaining columns of the example.

In performing division shove the slide H, which is not used in division, up or down off from the columns of the tablet P. Record on the tapes K by operation on their heavy figures the digits of the dividend, or as many thereof as the tapes will receive, commencing at the left-hand band with the left-hand digit. Place the figures found opposite the digits of the divisor in table V on the tablet P in the same manner as those of the multiplicand in cases of multiplication, commencing with the bottom row for the right-hand digit. The number of the divisor's digits being $p$, aline with the bottom row of the tablet P the letter, which is $p+1$ from the last one, inclusive, of the series on the movable band T. The first left-hand digit of the quotient having been ascertained by inspection, according to the usual rules, note its columns on the tablet P, according to its composition of the figures 7 4 2 1 by erasable marks on the row of erasable compartments on the lower face of section G. Subtract the numbers found in the rows of these columns thus noted, commencing with the bottom row from the digits of the dividend exhibited on the bands K, each row being subtracted from the digit on that band which bears the same letter as its own on the movable band T. Now move the latter upward one point and efface the marks on the erasable compartments on the lower face of section G. Proceed in the same manner in succession with the remaining digits of the quotient, at each step noting the same on the calculating-sheet until the remainder of the example is duly displayed on the tapes K.

When the number of bands K is sufficient to display all the digits of the given dividend, as may be provided in the construction, the above directions are sufficient; but let the number of the bands K, as in the drawings, be $p+1$ or only one more than the rows on the tablet P, and thus than the digits of a possible divisor, duly represented on said rows.

The above directions for each successive step of the operation are modified as follows: Move the column of letters T upward one point, efface the marks on the erasable compartments on the lower face of section G and on the band K, which is indicated by the letter on T at the bottom row of tablet P, and the button M of which duly stands at the flange C, register the dividend's next unregistered digit, which may be done on the right-hand column of the tape's figures, without shifting the screen, by carrying its button to the place of the complement of said digit.

Having thus described my invention, what I claim as new, and desire to secure by Letters Patent, is—

1. In a calculating-machine, one or more movable indicating and registering tapes or slides, each tape or slide being provided with two sets, twice consecutively produced thereon, of numerals, the numerals of the two sets arranged side by side and each being the complement of ten to the other, each tape or slide being further provided at one point only, that indicated by zero thereon, with an apertured button, whereby the said tape or slide is actuated, a movable screen, covering one or the other of the two sets, as desired, and an inclosing casing, provided with a sight-opening over only one of the sets of numerals, whereby the results, whether of addition or subtraction, are read from the same set of numerals.

2. In a calculating-machine, one or more movable indicating and registering tapes or slides, each being provided with two sets, twice consecutively produced thereon, of numerals, the numerals of the two sets arranged side by side and each being the complement of ten to the other, each tape or slide being further provided at one point only, that indicated by zero thereon, with an apertured button, whereby the said tape or slide is actuated.

3. In a calculating-machine, one or more movable indicating and registering tapes or slides, each tape or slide being provided with two sets, twice consecutively produced thereon, of numerals, the numerals of the two sets arranged side by side and each being the complement of ten to the other, each tape or slide being further provided at one point only, that indicated by zero thereon, with an apertured button, whereby the said tape or slide is actuated, and an inclosing casing, provided with a sight-opening over only one of the sets of numerals, whereby the results, whether of addition or subtraction, are read from the same set of numerals.

4. The section G, having the tablet P, in combination with the sliding section H, having a series of alternate slots and columns, and arranged to slide over the tablet P, substantially as described.

5. The section G, having the tablet P and the table V, substantially as described.

6. The pointer provided with a registering-wheel combined with an oscillating finger for moving the tapes or bands and connected to move the wheel one tooth only when the tape or band is moved by the pointer in one direction for any distance and not to move the wheel when the tape or band is moved in the opposite direction, substantially as described.

7. The pointer provided with an oscillating finger arranged with an escapement-wheel and pallet for rotating the wheel tooth by tooth, combined with a lever arranged to be operated by said finger, a dial arranged to be rotated by the shaft, of the escapement and formed with sockets and movable blocks fitted in said sockets and arranged to be moved to the rear by the action of the said lever, substantially as described.

8. The tape or bands provided with digits and movably held in a suitable support, combined with a section, G, having a tablet P, divided into columns and rows, a movable tape, T, and a central notched bar, $S^2$, substantially as described.

9. The tapes or bands provided with digits and movably held on a suitable support in combination with the section, G, and the section, H, formed with alternate slots and columns and arranged to slide under the face of the section, G, substantially as described.

10. The section, G, having the tablet, P, and the table V, and central bar, S², in combination with the sliding section, H, formed with a strip, H³, having a series of holes therein and having a series of alternate slots and columns substantially as described.

11. The main frame, A, provided with a support, L, having a series of tapes or bands placed therein and adapted to be moved along said support, in combination with the section, G, arranged to slide in said main frame and a sliding section, H, formed with alternate slots and columns and adapted to slide under the face of the section, G, substantially as described.

JACOB B. MOORE.

Witnesses:
DALLAS SUMNER,
GEO. E. BALES,
F. M. PEVEY.